350-382 SR

OR 3,535,020

INVENTORS.
UWE SCHMIDT
KARL J. SCHMIDT-TIEDEMANN
BY Frank R. Trifari
AGENT

INVENTORS.
UWE SCHMIDT
KARL J. SCHMIDT-TIEDEMANN
BY
Frank R. Trifari
AGENT

1

3,535,020
ARRANGEMENT FOR REDUCING THE STRAY LIGHT IN DIGITAL LIGHT DEFLECTING SYSTEMS

Uwe Schmidt, Pinneberg, Holstein, and Karl Joachim Schmidt-Tiedemann, Rellingen, Germany, assignors, by mesne assignments, to U.S. Philips Corporation, New York, N.Y., a corporation of Delaware
Filed Feb. 26, 1968, Ser. No. 708,405
Claims priority, application Germany, Feb. 24, 1967, P 41,485
Int. Cl. G02f *1/26*
U.S. Cl. 350—150 3 Claims

ABSTRACT OF THE DISCLOSURE

A digital deflection system with provision for elimination of stray light including an auxiliary light source passing through the polarizing switch of the main source beam and including a detector for sensing variations in light for correcting the modulation voltage applied to the polarizing switch.

The invention relates to an arrangement for reducing the stray light in digital light deflecting systems which enable a lightbeam to be deflected in discrete directitons, for example by means of Kerr cells and polarization elements.

As is known, in digital light deflecting systems stray light may occur if, in addition to the signal beam, light propagates in unwanted directions. Some of the possible causes of the occurrence of this stray light are the fluctuations of the high voltages required for the electro-optic switches and changes in the electrooptic constants due to temperature variatitons. It is an object of the present invention to control and compensate for these disturbances by means of a simple arrangement. The invention is characterised in that in addition to a useful beam an auxiliary beam is passed through one or more of the polarization switches. The condition of polarization of this auxiliary beam is used for maintaining constant a modulation voltage applied to the polarization switch or switches. A change in the properties of the polarization switch is measured as a change in the polarization condition of the auxiliary beam, a correction for the voltages to be applied to the polarization switch or switches being derived from the measurement.

Figure 2:
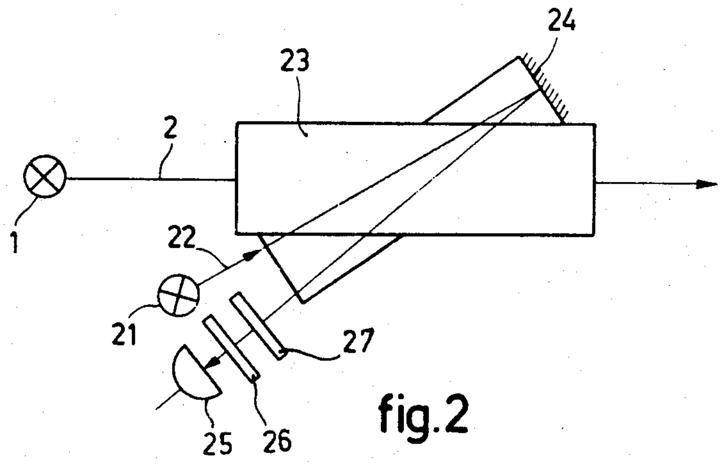
Figure 3:
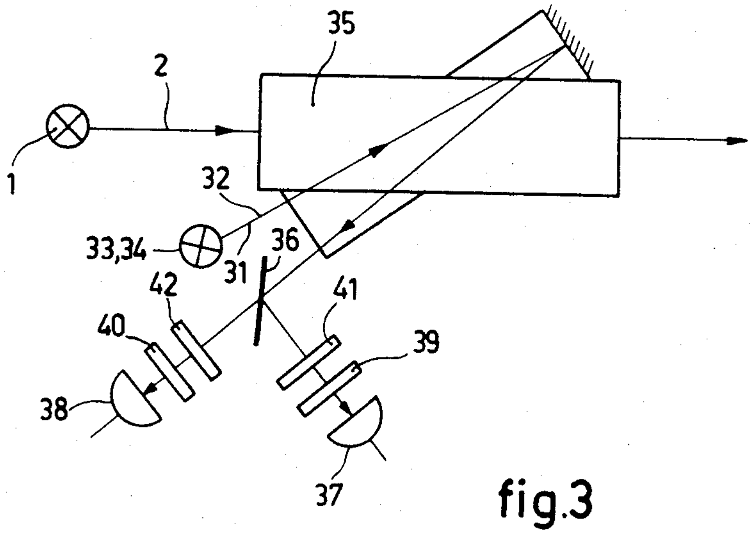
Figure 4:
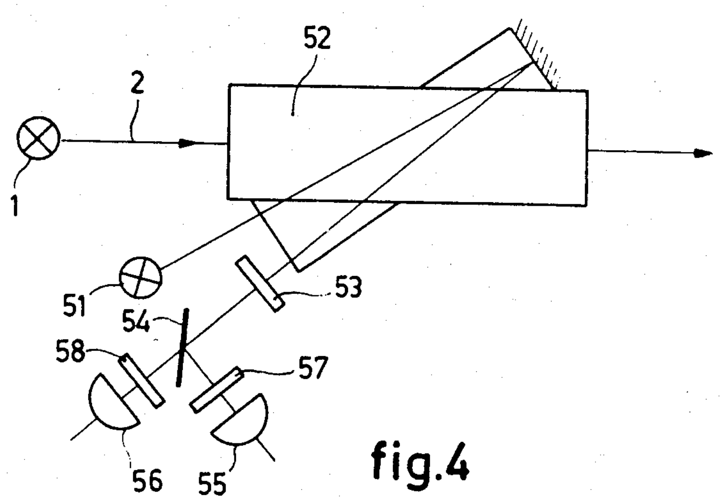

The drawing shows embodiments of the invention given by way of examples. In the drawings FIG. 1 shows a polarization switch employing two auxiliary beams and two photodetectors, FIG. 2 shows a switch employing one auxiliary beam and one photodetector, FIG. 3 shows a switch employing one auxiliary beam, a beam splitter and two birefringent plates, FIG. 4 shows a switch employing one auxiliary beam, one beam splitter and one birefringent plate.

Figure 1:
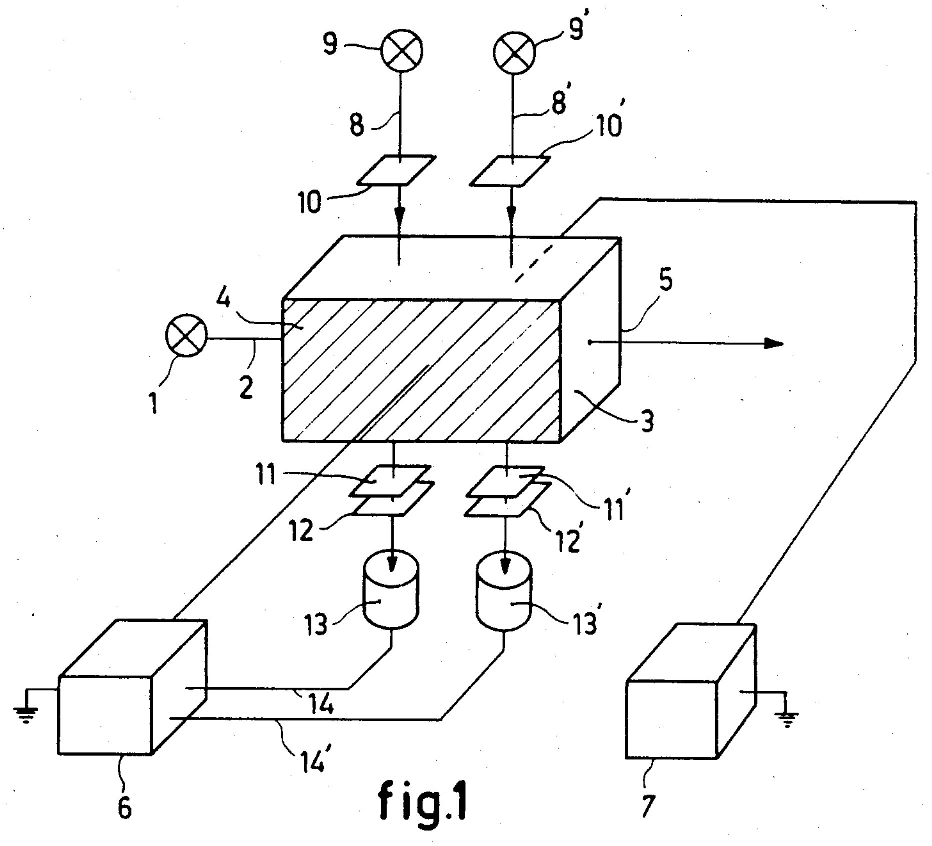

In FIG. 1 a light beam 2 which is produced by a source of light 1 and is to be modulated passes through a polarization switch 3 in the direction of length thereof. It is assumed that the polarization switch is a Kerr cell having electrodes 4 and 5. Electric potentials $\phi'_1$ and $\phi'_2$ are applied to electrode 4 and 5 by means of generators 6 and 7 respectively. The switch then is in the switching condition $Z_1$. The switching condititon $Z_2$ is obtained by the application of a potential $\phi''_2$ to the electrode 5. The voltages set up across the electrodes in the conditions $Z_1$ and $Z_2$ are denoted $U'_1$ and $U'_2$ respectively.

In practice, especially the requirements to be satisfied by the constancy of the voltage $U_1$ which is the actual voltage at condition Z, for any given time, may be very exacting, for example better than 0.1% at absolute values of 50 kv. For measuring this voltage an auxiliary beam 8, which is produced by a light source 9 and is plane polarized in a polarizer 10, propagates in the manner shown in a direction at right angles to the cell 3 and to the direction of the beam to be modulated, and after passing through a birefringent plate 11 and a plane polarizer 12 is incident on a photodetector 13. With suitable proportioning of the birefringent plate 11—a fine adjustment may be effected by rotating the plate about the direction of the beam—the beam intensity at the detector 13 may be set to zero. Deviations from the desired voltage $U'_1$ now will show themselves as an intensity at the detector 13 which differs from zero. By a change in $U_1$, which change is controlled through a feedback path 14, the desired voltage $U'_1$ can be regained.

When only a short time is available for effecting this correction, it is desirable to know whether the voltage $U_1$ is higher or lower than the desired value $U'_1$. In this case a second auxiliary beam 8' is passed, similarly to 8, transversely through the Kerr cell, as is shown in FIG. 1. However, in this case the birefringent plate (phase plate) 11' is set so that the intensity of the beam 8' differs from zero. Thus, a comparison between the intensities of the beams 8 and 8' provides immediate information about the position of $U_1$ relative to $U'_1$. In an identical manner the voltage $U_2$, which is the actual voltage at condition $Z_2$ for any given time, may be maintained at the desired value $U'_2$ by passing two further auxiliary beams through the Kerr cell.

In a further modified embodiment of the invention the number of detectors required may be reduced by a factor of two. FIG. 2 shows a respective embodiment. An auxiliary beam 22 which emerges from a source of light 21 and is plane polarized, is passed through a Kerr cell 23 in a manner such that the optical path length in this cell is equal to twice the effective length of the cell or to an integral multiple of this double length. In general, this requires a refraction at at least one reflector 24. To increase the accuracy of the measurements, however, more than one reflection may be caused to take place in the polarization switch 23.

A polarizer 26 and a birefringent plate 27, which precede the detector 25, are again adjusted so that the intensity of the auxiliary beam reaching the detector is zero when the voltage $U'_1$ is applied to the Kerr cell 23. By the application of the voltage $U'_2$ the plane of polarization is rotated by 180°, since both before and after reflection the beam is rotated by 90°. The intensity of the radiation incident on the detector 25 is again a minimum. The two zero posititons may then be used in the above-described manner for maintaining constant or controlling the voltages $U'_1$ and $U'_2$. Similarly to the preceding case, a second detector may indicate whether $U_1$ and $U_2$ are too high or too low.

In the modified embodiment of the arrangement of FIG. 1 shown in FIG. 3, auxiliary beams 31 and 32 follow the same path in the medium of a switch 35 and only after leaving the switch 35 they are divided by a beam splitter 36 and directed to a detector 37 and a detector 38 respectively. The polarizers 39 and 40 disposed in either of the optical paths following the detector 37 have directitons of polarization perpendicular to one another. They are preceded by birefringent plates 41 and 42 respectively.

Obviously, the common path of the auxiliary beams will also be possible in a system as is shown in FIG. 1. With multiple reflection, i.e. with increase in the optical path length in the Kerr cell, the sensitivity of the zero determination is also increased.

The relationship between the voltage difference $U'_1-U_1$ and the intensity of the auxiliary beam at the detector 37 is not linear. This relationship may be linearised by altering the arrangement shown in FIG. 3 into the arrangement shown in FIG. 4. A plane polarized auxiliary beam from a source of light 51 after passing through a Kerr cell 52 is again plane polarized by a phase plate 53. The plane polarized light is passed on to two detectors 55 and 56. Splitting up may be effected by known methods, for example by means of a polarization separating splitting prism 54 and two polarizers 57 and 58 having directions of polarization perpendicular to one another. A comparison of the two signals, for example in a bridge circuit, indicates both the magnitude and the direction of the difference $U'_1-U_1$.

The wavelengths of the auxiliary beams need not necessarily be equal to the wavelengths of the beam 2 to be modulated. Therefore it is immaterial whether the auxiliary beams are produced by the same source of light as the beam 2 to be modulated or by a separate light source.

Although hitherto Kerr cells have been mentioned as polarization switches, electro-optic polarization switches of other types may also be used in the manner described without departing from the scope of the invention. In principle it is immaterial whether the switches concerned are based on the linear or the square, on the longitudinal or the transversal effect.

With respect to the evaluation of the phase shift which the auxiliary beam experiences in the polarization switch to be controlled, the examples described give no limitative indications. Within the scope of the invention other methods may also be used, for example methods of the kind used in analysing birefringent materials.

It also falls within the scope of the invention that the above-described control is not limited to a single polarization switch of the digital light deflecting system but may simultaneously be applied to several switches.

What is claimed is:

1. An arrangement for reducing stray light in a digital light deflecting system comprising light source means for generating a useful beam and an auxiliary beam, a polarization switch receiving and passing said useful beam, means for passing said auxiliary beam through said polarization switch at an angle to said useful beam, means applying a modulation voltage to said polarization switch, and means responsive to the polarization condition of said auxiliary beam for controlling the variation of said modulation voltage applied to said polarization switch.

2. The combination of claim 1 further including a second auxiliary beam said second beam passing through said polarization switch at an angle to said useful beam, and means responsive to polarization condition of said second auxiliary beam through said polarization switch for providing a further control of said variation.

3. The combination of claim 1 wherein the effective optical path length of said auxiliary beam is equal to an integral multiple of twice the effective optical length of said polarization switch.

References Cited

UNITED STATES PATENTS

| | | | |
|---|---|---|---|
| 1,885,604 | 11/1932 | Karolus | 350—150 |
| 2,064,289 | 12/1936 | Cady | 350—150 |

OTHER REFERENCES

Schmidt: "High Speed Digital Light Beam Deflector," T.R.W., September 1964, pp. 205–206.

Schmidt et al.: "The Problem of Light Beam Deflection at High Frequencies," Optical Processing of Information, pp. 98–103, 1963.

Kulcke: "A Fast, Digital-Indexed Light Deflector," IBM Journal, January 1964, pp. 64–67.

Lee et al.: "Transmission and Self-Generated Noise Characteristics of Polarization Scanned Digital Optical Systems," Applied Optics, vol. 3, No. 11, November 1964, pp. 1305–1310.

Fowler et al.: "A Survey of Laser Beam Deflection Techniques," Applied Optics, vol. 5, No. 10, pp. 1675–1682, October 1966.

DAVID SCHONBERG, Primary Examiner

P. R. MILLER, Assistant Examiner

U.S. Cl. X.R.

350—157; 356—117